United States Patent Office 3,736,268
Patented May 29, 1973

---

3,736,268
ANTISTATIC COMPOSITION
Teiji Habu and Kyusaku Yoshida, Tokyo, Katsutoshi Machida, Sagamihara, Natsuko Wada, Kodaira, and Masao Ishihara, Tokyo, Japan, assignors to Konishiroku Photo Industry Co., Ltd., Tokyo, Japan
No Drawing. Filed July 29, 1971, Ser. No. 167,472
Claims priority, application Japan, Aug. 5, 1970, 45/67,989
Int. Cl. H01b 1/06; G03c 1/82
U.S. Cl. 252—500                                       7 Claims

ABSTRACT OF THE DISCLOSURE

An antistatic composition which comprises a protective colloid solution and, dispersed therein, a solution prepared by dissolving in a substantially water-insoluble organic solvent lower in specific gravity than the protective colloid, an antistatic agent of the Formula I or II,

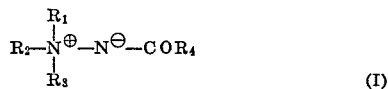

(I)

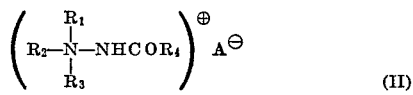

(II)

wherein $R_1$, $R_2$ and $R_3$ are individually an alkyl group or an aralkyl group; $R_4$ is an alkyl group, an aryl group or a hetero ring; and A is $XO_4$, X or $BX_4$, where X is a halogen atom.

The composition is particularly suitable for use in photographic materials.

---

This invention relates to a novel antistatic composition capable of imparting excellent antistatic characteristics to a shaped article particularly including a photographic material.

The charging phenomenon of insulators has not theoretically been elucidated yet, but is chiefly deemed as a surface phenomenon, in general. It is considered that when insulators are contacted or frictioned with each other, or peeled off from each other, the mechanical energy applied thereto is converted to an electric energy, whereby static electricity is generated to charge the insulators. Accordingly, the greater the amount of the mechanical energy applied, the larger the amount of the static electricity generated. However, the charging phenomenon varies depending on the combination of insulators which are contacted or frictioned with each other, and thus is an extremely complex phenomenon.

The above-mentioned charging phenomenon of insulators frequently brings about serious drawbacks in the fields where insulators are utilized, and it is well known that said phenomenon is fatal to such high sensitivity materials as, for example, light-sensitive photographic materials. That is, the generation of static electricity in a light-sensitive photographic material tends to cause the formation of so-called static marks due to the discharge of said electricity, and since the static marks cannot be observed unless the photographic material is developed, the charging phenomenon is extremely troublesome.

Processes for protecting insulators from the charging phenomenon may be roughly divided into two; one is a process in which the amount of static electricity generated is decreased, and the other is a process in which the static electricity generated is discharged quickly. According to the former process, the so-called triboelectric series, i.e. the phenomenon that the charging phenomenon varies depending on the combination of insulators to be contacted or frictioned with each other, is utilized, or the contact areas of the insulators are made small, while according to the latter process, conductivity is imparted to the insulators by adoption of a certain procedure. In most cases, however, the two processes are employed in combination in order to attain a sufficient antistatic effect.

Most of the antistatic agents which have been proposed hitherto are those of the type which are used in the latter process, in which an ion-conductive antistatic agent, for example, is coated or adsorbed on the surface of an insulator, or is incorporated into the insulator, to decrease the specific resistance of the insulator surface, thereby imparting conductivity to the insulator. Antistatic agents of this type are composed mainly of certain kinds of surface active agents. When an insulator, which has been treated with an antistatic agent of this kind by such means as coating, adsorption or incorporation, is washed with water or frictioned, the insulator is deteriorated in antistatic effect, and the deterioration in antistatic effect becomes marked with lapse of time or due to the state of the environment such as, for example, temperature, humidity and the like. Further, when this kind of antistatic agent is applied to a light-sensitive photographic emulsion, the antistatic agent interacts with a photographic additive or a surface active agent contained therein to cause adverse influences on the coatability of the emulsion or on the photographic properties of the light-sensitive material obtained therefrom.

The present invention provides a novel antistatic composition capable of overcoming such drawbacks of the conventional antistatic process as mentioned above.

The composition according to the present invention is an antistatic composition of a new type prepared by dispersing in a protective colloid solution a solution of an antistatic agent in a substantially water-insoluble organic solvent, which is lower in specific gravity than the protective colloid, said composition being further characterized in that the antistatic agent used is a novel compound of the general Formula I or II shown below. The antistatic composition of the present invention successfully enhances the excellent characteristics of the antistatic composition of the above-mentioned type.

General Formula I:

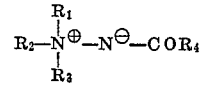

General Formula II:

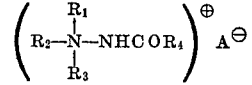

wherein $R_1$, $R_2$ and $R_3$ are individually an alkyl group or an aralkyl group; $R_4$ is an alkyl group, an aryl group or a heterocyclic ring; and A is $XO_4$, X or $BX_4$, where X is a halogen atom.

The above-mentioned novel antistatic agent is particularly excellent for use in photographic materials and, in case the antistatic agent is incorporated in the antistatic composition of the above-mentioned type, the characteristics thereof can be displayed more successfully. When the antistatic composition of the present invention is applied to an insulator, an excellent antistatic property can be imparted to the insulator. Particularly, the composition according to the present invention is effectively applicable to a high sensitivity material such as a light-sensitive photographic material. For example, when the antistatic composition of the present invention is applied as the upper-most layer of a light-sensitive photographic material by coating or the like means, the photographic material is not only prevented from charging phenomenon due to contact or friction with various members (e.g. parts inside a camera or other light-sensitive photographic materials), but also freed from deterioration in antistatic effect due to development or from detrimental interactions with other photographic additives and other surface active agents contained therein. Further, the present antistatic composition can provide a greater antistatic effect than in the case where the antistatic composition of the aforesaid type is used in admixture with a known antistatic agent. Accordingly, when the present composition is incorporated into an optional layer constituting a light-sensitive photographic material, it is possible to prevent more successfully the charging phenomenon brought about during the preparation of the photographic material.

Typical examples of the antistatic agent of the aforesaid general formula which is used in the present invention are enumerated below, but it is needless to say that antistatic agents usable in the present invention are not limited thereto.

COMPOUNDS OF THE GENERAL FORMULA I

| Exemplification No. | $R_1$ | $R_2$ | $R_3$ | $R_4$ | Calculated C | Calculated H | Calculated N | Found C | Found H | Found N |
|---|---|---|---|---|---|---|---|---|---|---|
| 1 | $CH_3$ | $CH_3$ | $CH_3$ | $C_9H_{19}-$ | 68.37 | 12.36 | 12.27 | 66.85 | 12.55 | 11.38 |
| 2 | $CH_3$ | $CH_3$ | $CH_3$ | $C_{11}H_{23}-$ | 70.26 | 12.58 | 10.93 | 69.72 | 12.76 | 10.61 |
| 3 | $CH_3$ | $CH_3$ | $CH_3$ | $C_{15}H_{31}-$ | 73.01 | 12.90 | 8.96 | 72.12 | 12.79 | 8.20 |
| 4 | $CH_3$ | $CH_3$ | $CH_3$ |  | 67.38 | 7.92 | 15.72 | 66.80 | 8.19 | 16.00 |
| 5 | $CH_3$ | $CH_3$ | $CH_3$ |  | 60.31 | 7.31 | 23.45 | 59.92 | 7.22 | 24.11 |
| 6 | $CH_3$ | $CH_3$ | $C_2H_5$ | $C_{15}H_{31}-$ | 73.56 | 12.96 | 8.58 | 72.78 | 12.76 | 8.34 |
| 7 | $CH_3$ | $CH_3$ | $C_{12}H_{25}$ | $CH_3-$ | 71.05 | 12.67 | 10.36 | 70.06 | 12.45 | 10.15 |
| 8 | $CH_3$ | $CH_3$ | 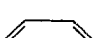 | $C_{15}H_{31}-$ | 77.26 | 11.41 | 7.21 | 76.77 | 11.37 | 7.06 |
| 9 | $CH_3$ | $CH_3$ | 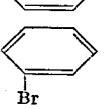 | $C_5H_{11}-$ | 55.05 | 7.08 | 8.56 | 54.60 | 7.28 | 8.11 |
| 10 | $CH_3$ | $C_2H_5$ | $C_2H_5$ | $C_{11}H_{23}-$ | 71.77 | 12.76 | 9.85 | 70.98 | 12.53 | 9.13 |
| 11 | $C_2H_5$ | $C_2H_5$ | $C_2H_5$ | $C_{15}H_{31}-$ | 74.51 | 13.08 | 7.90 | 73.66 | 12.85 | 7.23 |
| 12 | $CH_3$ | $CH_3$ | $C_8H_{17}-$ | $C_7H_{15}-$ | 74.42 | 12.83 | 9.39 | 72.55 | 12.85 | 9.42 |
| 13 | $CH_3$ | $CH_3$ | $CH_3CHCH_2-$ $\quad\quad\quad OH$ | $C_{11}H_{23}-$ | 67.94 | 12.07 | 9.32 | 68.02 | 12.33 | 9.38 |
| 14 | $CH_3$ | $CH_3$ | $C_6H_{13}CHCH_2-$ $\quad\quad\quad OH$ | $C_{11}H_{23}-$ | 71.29 | 12.51 | 7.56 | 71.31 | 12.50 | 7.66 |
| 15 | $CH_3$ | $CH_3$ | $C_8H_{17}OCH_2CHCH_2-$ $\quad\quad\quad\quad\quad OH$ | $C_{11}H_{23}-$ | 69.53 | 12.84 | 6.49 | 68.72 | 12.56 | 6.01 |
| 16 | $CH_3$ | $CH_3$ | $C_4H_9-$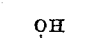$-OCH_2CHCH_2-$ $\quad\quad\quad\quad\quad\quad\quad\quad OH$ | $C_{11}H_{23}-$ | 72.27 | 10.78 | 6.25 | 71.92 | 10.01 | 5.74 |
| 17 | $CH_3$ | $C_2H_5$ | $C_{12}H_{25}O(C_2H_4O)_4CH_2CHCH_2-$ $\quad\quad\quad\quad\quad\quad\quad\quad\quad OH$ | $C_7H_{15}-$ | 65.98 | 11.40 | 4.53 | 64.99 | 10.63 | 4.05 |
| 18 | $CH_3$ | $CH_3$ | $HOCH_2CH_2-$ | $C_{15}H_{31}-$ | 70.12 | 12.36 | 8.18 | 70.35 | 12.05 | 8.31 |

COMPOUNDS OF THE GENERAL FORMULA II

| Exemplification No. | $R_1$ | $R_2$ | $R_3$ | $R_4$ | A | Calc. C | Calc. H | Calc. N | Calc. A | Found C | Found H | Found N | Found A |
|---|---|---|---|---|---|---|---|---|---|---|---|---|---|
| 19 | $CH_3$ | $CH_3$ | $CH_3$ | $CH_3$ | I | 24.61 | 5.37 | 11.48 | 51.99 | 24.68 | 5.40 | 11.45 | 52.12 |
| 20 | $CH_3$ | $CH_3$ | $CH_3$ | $C_9H_{19}$ | I | 43.82 | 8.20 | 7.86 | 35.62 | 43.82 | 8.36 | 7.93 | 35.89 |
| 21 | $CH_3$ | $CH_3$ | $CH_3$ | $C_{11}H_{23}$ | Br | 53.40 | 9.86 | 8.31 | 23.69 | 53.62 | 10.12 | 8.13 | 23.82 |
| 22 | $CH_3$ | $CH_3$ | $CH_3$ | $C_{11}H_{23}$ | I | 46.88 | 8.65 | 7.29 | 33.02 | 46.91 | 8.65 | 7.33 | 33.41 |
| 23 | $CH_3$ | $CH_3$ | $CH_3$ | $C_{15}H_{31}$ | Cl | 65.38 | 11.84 | 8.03 | 10.16 | 65.03 | 11.99 | 8.16 | 10.25 |
| 24 | $CH_3$ | $CH_3$ | $CH_3$ | $C_{15}H_{31}$ | Br | 57.99 | 10.50 | 7.12 | 20.31 | 57.92 | 10.69 | 6.88 | 20.32 |
| 25 | $CH_3$ | $CH_3$ | $CH_3$ | $C_{15}H_{31}$ | I | 51.81 | 9.38 | 6.36 | 28.81 | 52.00 | 9.55 | 6.65 | 29.44 |
| 26 | $CH_3$ | $CH_3$ | $CH_3$ | $C_{15}H_{31}$ | $ClO_4$ | 55.25 | 10.01 | 6.78 | 8.59 | 55.22 | 10.04 | 6.81 | 8.70 |
| 27 | $CH_3$ | $CH_3$ | $CH_3$ | $C_{15}H_{31}$ | $BF_4$ | 57.00 | 10.32 | 7.00 | 18.98 | 57.27 | 10.84 | 7.20 | |
| 28 | $CH_3$ | $CH_3$ | $C_2H_5$ | $C_{15}H_{31}$ | $BF_4$ | 57.97 | 10.46 | 6.76 | 18.34 | 57.54 | 10.64 | 6.86 | |
| 29 | $CH_3$ | $CH_3$ | 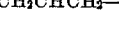 | $C_{15}H_{31}$ | $ClO_4$ | 61.39 | 9.27 | 5.73 | 7.25 | 61.51 | 9.33 | 5.72 | 7.36 |
| 30 | $CH_3$ | $CH_3$ | 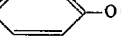 | H | Br | 35.53 | 4.18 | 8.29 | 47.27 | 35.47 | 4.18 | 8.31 | 47.55 |
| 31 | $CH_3$ | $CH_3$ |  | H | Br | 48.36 | 6.27 | 10.25 | 29.25 | 48.44 | 6.31 | 10.22 | 29.01 |

FORMULA II—Continued

| Exemplification No. | R₁ | R₂ | R₃ | R₄ | A | Calculated C | H | N | A | Found C | H | N | A |
|---|---|---|---|---|---|---|---|---|---|---|---|---|---|
| 32 | CH₃ | CH₃ | —CH₂—C₆H₄—Cl | H | Cl | 48.21 | 5.67 | 11.24 | 28.46 | 48.25 | 5.68 | 11.30 | 28.52 |
| 33 | CH₃ | CH₃ | —CH₂—C₆H₄—NO₂ | H | Cl | 46.25 | 5.43 | 16.18 | 13.65 | 46.28 | 5.41 | 16.28 | 13.75 |
| 34 | CH₃ | CH₃ | —CH₂—C₆H₄—CF₃ | H | Br | 40.39 | 4.31 | 8.56 | ........ | 40.41 | 4.30 | 8.66 | ........ |
| 35 | CH₃ | CH₃ | —CH₂—C₆H₄—Br | CH₃ | Br | 37.53 | 4.58 | 7.96 | 45.39 | 37.55 | 4.60 | 8.01 | 45.45 |
| 36 | CH₃ | CH₃ | Same as above | C₃H₇ | Br | 41.08 | 5.30 | 7.37 | 42.04 | 41.05 | 5.35 | 7.51 | 42.00 |
| 37 | CH₃ | CH₃ | ....do.... | C₅H₁₁ | Br | 44.14 | 5.93 | 6.86 | 39.15 | 44.18 | 5.92 | 6.82 | 39.27 |
| 38 | C₂H₅ | C₂H₅ | CH₃ | C₁₁H₂₃ | I | 49.51 | 9.04 | 6.79 | 30.77 | 49.58 | 9.11 | 6.91 | 31.02 |
| 39 | C₂H₅ | C₂H₅ | CH₃ | C₁₅H₃₁ | I | 55.84 | 9.68 | 5.98 | 27.09 | 53.92 | 9.72 | 6.02 | 27.51 |
| 40 | C₂H₅ | C₂H₅ | C₂H₅ | C₁₁H₂₃ | I | 50.70 | 9.22 | 6.57 | 29.76 | 50.72 | 9.24 | 6.55 | 29.84 |
| 41 | C₂H₅ | C₂H₅ | C₂H₅ | C₁₅H₃₁ | I | 54.76 | 9.82 | 5.81 | 26.30 | 54.78 | 9.82 | 5.77 | 26.33 |

The above-mentioned compounds can be synthesized according to the processes disclosed in the Journal of the Chemical Society, 2264 (1964), by W. H. Berry and P. Brocklehurst; the Journal of Organic Chemistry, 24, 660 (1959) by R. H. Hinman and 33, 1374 (1968), by R. C. Slagel; and United States Pat. No. 3,064,051 (1962).

Typical concrete procedures for the synthesis of the above-mentioned compounds are set forth below with reference to synthesis examples.

SYNTHESIS EXAMPLE 1

Synthesis of the compound of exemplification No. 3

A solution of 10 g. of N,N-dimethyl-N'-hexadecanoyl hydrazine in 40 ml. of methyl iodide is refluxed for 22 hours. After completion of the reaction, excess methyl iodide is removed by distillation under reduced pressure, and the residue is recrystallized from methanol to obtain 14.2 g. of N-trimethyl-N'-hexadecanoyl hydrazinium iodide, yield 96.3%, M.P. 142–143° C.

*Elementary analysis.*—Calculated for $C_{19}H_{41}ON_2I$ (percent): C, 51,81; H, 9.38; N, 6.36. Found (percent): C, 52.20; H, 9.55; N, 6.65.

To a suspension of 11 g. of the above-mentioned hydrazinium iodide in 30 ml. of water is added with stirring a solution of 1.5 g. of sodium hydroxide in 10 ml. of water, and the resulting mixture is heated over a water bath at 50° to 60° C. for 20 minutes to form a solution. After cooling, the solution is extracted with chloroform, and the chloroform layer is washed with a saturated aqueous sodium chloride solution and then dried with anhydrous sodium sulfate.

After separating the anhydrous sodium sulfate by filtration, the chloroform is removed by distillation under reduced pressure, and the resulting crystals are recrystallized from petroleum benzene to obtain 73 g. of N-trimethylamine hexadecanimide, yield 93.5%, M.P. 71.5–73° C.

SYNTHESIS EXAMPLE 2

Synthesis of the compound of exemplification No. 28

A solution of 29.9 g. of N,N-dimethyl-N'-hexadecanoyl hydrazine in 300 ml. of dry ether is charged with 20.9 g. of triethyloxonium fluoroborate, and then refluxed for 1 hour and 30 minutes. Subsequently, the ether is removed by distillation under reduced pressure, and the residue is dissolved in 30 ml. of methanol. To this solution is added 300 ml. of ether to deposit white crystals, which are then recovered by filtration. Thereafter, the crystals are repeatedly recrystallized from a solvent comprising methanol and ether to obtain 33.2 g. of white plate-like crystals, yield 80%, M.P. 77–77.5° C.

The substantially water-insoluble organic solvent, which is used to dissolve the above-mentioned anti-static agents, is required to be lower in specific gravity than the protective colloid, which is left when the protective colloid solution is dried. It is considered that the organic solvent takes part in the surfacial agglomeration of the antistatic agents to make them effectively display their antistatic effects. As such solvent, there is used an organic solvent of the phthalate, pyrrolidone or phosphate type, and typical examples thereof are dimethyl phthalate, dibutyl phthalate, oleyl pyrrolidone, lauryl pyrrolidone, triphenyl phosphate, tricresyl phosphate and tributylphenyl phosphate.

The protective colloid used in the present invention may be any of the known protective colloids, and typical examples thereof are gelatin, casein, agar and polyvinyl alcohol. These protective colloids may be used either singly or in the form of a mixture, or in admixture with synthetic resins. The protective colloids are used in the form of a solution in a suitable solvent such as water or the like.

The antistatic composition of the present invention is prepared by dissolving the antistatic agent of the aforesaid general formula in the above-mentioned organic solvent, which is lower in specific gravity than the protective colloid used, and then dispersing the resulting solution by use of a suitable disperser in a solution of the protective colloid. In this case, the amount of the antistatic agent is preferably 0.05 to 5 parts per 10 parts of the organic solvent, and the concentration of the protective colloid solution is preferably about 0.5 to 15%. The ratio of the organic solvent solution of the antistatic agent to the protective colloid solution varies depending on whether the resulting antistatic composition is applied as it is or after dilution, and is ordinarily in the range from 1:1 to 1:30.

The thus obtained antistatic composition is applied onto the surface of an insulator in a proportion of preferably 0.5 to 50 cc. per m.². In case the antistatic composition is desired to be incorporated into a constitutive layer of a light-sensitive photographic material, it is used in such amount that the abovementioned proportion can be attained after coating. Examples of the light-sensitive photographic material used in the above case are light-sensitive silver halide color photographic materials, light-sensitive silver halide black-white photographic materials, light-sensitive materials for radioactive rays, etc. The antistatic composition of the present invention does not injure the photographic properties of these light-sensitive materials.

In order to disperse stably and uniformly the organic solvent solution of antistatic agent into the protective colloid solution, there may be used a surface active agent. As the surface active agent, any of anionic, nonionic, amphoteric and cationic surface active agents can be successfully used. In this case, 2 or more parts of a 5% solution of the surface active agent is used per 10 parts of the antistatic agent-containing solution, whereby the antistatic agent solution can be stably dispersed in the protective colloid solution.

In case gelatin is used as the protective colloid, and in case a solution of the antistatic agent in the aforesaid organic solvent is uniformly dispersed, together with a solution of the surface active agent, in an aqueous solution of the gelatin by use of such a disperser as an ultrasonic disperser, and then the resulting composition is cooled and stably stored in a gelled state, there is attained such a marked convenience that the composition can be re-dissolved in a required amount so as to be used any time as occasion demands.

Generally, the particles of an organic solvent solution of the aforesaid antistatic agent have a diameter of 0.1 to $50\mu$, and hence are stably dispersed in the protective colloid solution.

An insulator, to which has been applied the thus prepared antistatic composition of the present invention, can successfully be protected from the charging phenomenon due to contact or friction thereof with, or peeling thereof from, various materials. At the same time, such antistatic effect as mentioned above is not deteriorated due to the state of the surroundings, and the insulator can effectively display its characteristics over a long period of time without being deteriorated in antistatic effect even when it is subjected to water-washing or the like.

The present invention is illustrated in further detail below with reference to examples.

EXAMPLE 1

1 part of the antistatic agent of exemplification No. 3 was dissolved at an elevated temperature in 10 parts of dibutyl phthalate. This solution was stirred together with 7 parts of an amphoteric ionic surface active agent (5% aqueous solution) and 40 parts of a 5% aqueous gelatin solution, and then subjected to an ultrasonic disperser to form a dispersion. The particles in the dispersion were less than $2\mu$ in size. This dispersion was gelled at a low temperature and then stored. The gelled dispersion was quite stable. Thereafter, the gelled dispersion was re-dissolved and added to a protective layer-forming solution for a double-faced light-sensitive material, which solution was then coated on a double-faced light-sensitive material so that the proportion of the dispersion became 1 to 20 cc. per m.$^2$ of said light-sensitive material, followed by drying to prepare a double-faced light-sensitive photographic material. This photographic material was moistened at 20 to 60% RH for 6 hours, frictioned with rubber or a nylon or Teflon cloth, developed, and then subjected to static mark formation test. As the result, no static mark formation was observed at all in the photographic material.

EXAMPLE 2

0.5 part of the antistatic agent of examplification No. 11 was dissolved at an elevated temperature in 10 parts of dibutyl phthalate. This solution was stirred together with 10 parts of an anionic surface active agent (5% aqueous solution) and 40 parts of a 7% aqueous gelatin solution, and then subjected to an ultrasonic disperser to form a dispersion. The particles in the dispersion were less than $2\mu$ in size. This dispersion was gelled at a low temperature and then stored. The gelled dispersion was quite stable. Thereafter, the gelled dispersion was re-dissolved and added to a protective layer-forming solution for single-faced light-sensitive material, which solution was then coated on a single-faced light-sensitive material so that the proportion of the dispersion became 0.5 to 10 cc. per m.$^2$ of the light-sensitive material, followed by drying to prepare a single light-sensitive photographic material. In this case, the coating property of the solution was markedly excellent. Subsequently, the photographic material was tested in the same manner as in Example 1. As the result, no deterioration in antistatic effect due to development treatment or the like nor static mark formation were observed in the photographic material.

EXAMPLE 3

0.5 part of each of the antistatic agents of exemplification Nos. 14 and 16 was dissolved at an elevated temperature in 10 parts of tricresyl phosphate. This solution was stirred together with 7 parts of a 5% aqueous anionic surface active agent solution and 30 parts of a 10% aqueous gelatin solution, and then subjected to an ultrasonic disperser to form a dispersion. The particles in the dispersion were less than $2\mu$. Each of the thus formed dispersions was added to each of protective layer-forming solution, silver halide emulsion layer-forming solution, sublayer-forming solution and backing layer-forming solution for light-sensitive photographic material. Subsequently, each of the said solutions was coated on a light-sensitive photographic material so that the proportion of the dispersion became 10 to 50 cc. per m.$^2$ of the light-sensitive material, followed by drying to prepare respective light-sensitive photographic materials. During the preparation of the photographic materials, there was brought about no such phenomenon as deterioration in coating property or the like which was encountered in the prior art process. Further, the photographic materials were tested in the same manner as in Example 1, but no static mark formation was observed in any photographic material.

EXAMPLE 4

3 parts of the antistatic agent of exemplication No. 10 was dissolved at an elevated temperature in an organic solvent comprising 10 parts of tricresyl phosphate and 10 parts of ethyl acetate. This solution was stirred together with 10 parts of a nonionic surface active agent (5% aqueous solution) and 40 parts of a 15% aqueous gelatin solution, and then subjected to an ultrasonic disperser to form a dispersion. This dispersion was added to a protective layer-forming solution, which was then coated on a light-sensitive material so that the amount of the dispersion became 0.5 to 40 cc. per m.$^2$ of the light-sensitive material, followed by drying to prepare a light-sensitive photographic material. In this case, an anionic surface active agent was used in order to improve the coating property of said protective film solution, but the antistatic agent showed no detrimental interaction with the active agent, and the said solution displayed excellent coating property. The thus obtained light-sensitive photographic material was tested in the same manner as in Example 1. As the result, no static mark formation was observed in the photographic material, and an excellent antistatic effect could be attained.

EXAMPLE 5

1 part of the antistatic agent of exemplification No. 2 was dissolved at an elevated temperature in 10 parts of oleyl pyrrolidone. This solution was stirred together with 10 parts of a 5% aqueous nonionic active agent solution and 50 parts of a 5% aqueous gelatin solution, and then subjected to an ultrasonic disperser to form a dispersion. This dispersion was added to a protective layer-forming solution, which was then coated on a light-sensitive photographic material so that the proportion of the dispersion became 10 to 50 cc. per m.$^2$ of the photographic material, followed by drying to prepare a light-sensitive photographic material. The thus prepared photographic material was tested in the same manner as in Example 1 to observe no static mark formation.

The same results as above were obtained also in the cases where the antistatic agents of exemplification Nos. 4 and 5 were individually used in place of the above-mentioned antistatic agent.

EXAMPLE 6

0.8 part of each of the antistatic agents of exemplification Nos. 23, 29, 35 and 41 was dissolved at an elevated temperature in 10 parts of tricresyl phosphate. Each of the resulting solutions was stirred together with 5 parts of a nonionic surface active agent (5% aqueous solution) and 40 parts of a 15% gelatin solution, and then subjected to an ultrasonic disperser to form a dispersion. The dispersions obtained in the above manner were gelled at a low temperature and then stored. The gelled dispersions were extremely stable.

Each of the gelled dispersions was re-dissolved and coated as an upper-most surface layer on a light-sensitive material so that the amount thereof became 0.5 to 40 cc. per m.$^2$ of the photographic material, followed by drying to prepare respective light-sensitive photographic materials. These photographic materials were tested in the same manner as in Example 1 to observe no static mark formation in any photographic material.

What is claimed is:

1. An antistatic composition which comprises a protective colloid solution and, dispersed therein, a solution prepared by dissolving in a substantially water-insoluble organic solvent lower in specific gravity than the protective colloid and selected from the group consisting of phthalate, pyrolidone and phosphate solvents, an antistatic agent of the Formula I or II,

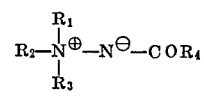

(I)

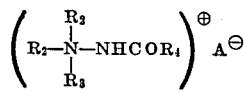

(II)

wherein $R_1$, $R_2$ and $R_3$ are individually an alkyl group or an aralkyl group; $R_4$ is an alkyl group, an aryl group or a hetero ring; and A is $XO_4$, X or $BX_4$, where X is a halogen atom.

2. An antistatic composition as claimed in claim 1, wherein the substantially water-insoluble organic solvent used is at least one member selected from the group consisting of dimethyl phthalate, diethyl phthalate, dibutyl phthalate, oleyl pyrrolidone, lauryl pyrrolidone, triphenyl phosphate, tricresyl phosphate and tributyl phosphate.

3. An antistatic composition as claimed in claim 1, wherein the protective colloid used is at least one member selected from gelatin, casein, agar and polyvinyl alcohol.

4. An antistatic composition as claimed in claim 1, further comprising a solution of a surface active agent.

5. An antistatic composition as claimed in claim 1, wherein the protective colloid solution is a solution of gelatin, casein, agar or polyvinyl alcohol in water.

6. An antistatic composition as claimed in claim 1, wherein the antistatic agent used is the compound of Formula I wherein $R_1$, $R_2$ and $R_3$ are —$CH_3$ and $R_4$ is —$C_{15}H_{31}$ and the substantially water-insoluble organic solvent used is tricresyl phosphate.

7. An antistatic composition as claimed in claim 1, wherein the antistatic agent used is the compound of Formula II where $R_1$, $R_2$ and $R_3$ are —$CH_3$, $R_4$ is —$C_{15}H_{31}$ and A is Cl and the substantially water-insoluble organic solvent used is tricresyl phosphate.

References Cited

UNITED STATES PATENTS

| | | | |
|---|---|---|---|
| 3,704,128 | 11/1972 | Koda et al. | 96—114.2 X |
| 3,549,369 | 12/1970 | Koda et al. | 96—87 A |
| 3,457,076 | 7/1969 | Yano et al. | 96—114.2 X |
| 3,615,531 | 10/1971 | Meyer et al. | 96—114.2 X |
| 3,619,284 | 11/1971 | Ray-Chaudhuri | 117—201 |

CHARLES E. VAN HORN, Primary Examiner

U.S. Cl. X.R.
96—87 A, 114.2; 117—201